United States Patent [19]

Lavanchy et al.

[11] 4,227,565

[45] Oct. 14, 1980

[54] FLOW CUT-OFF METHOD AND APPARATUS FOR FOUNDRY INSTALLATIONS

[75] Inventors: Gerard A. Lavanchy, Prilly-Lausanne; Marc-Henry Rossier, Epalingues; Fritz Mezger, Muntelier, all of Switzerland

[73] Assignee: Maschinenfabrik & Eisengiesserei Ed. Mezger AG, Berne, Switzerland

[21] Appl. No.: 937,753

[22] Filed: Aug. 29, 1978

[30] Foreign Application Priority Data

Sep. 5, 1977 [CH] Switzerland ..................... 10808/77

[51] Int. Cl.³ .............................................. B22D 46/00
[52] U.S. Cl. ......................................... 164/155; 164/4
[58] Field of Search ................... 164/4, 150, 154, 155, 164/156, 449, 450, 133; 364/472, 477; 307/261, 268; 328/58, 127

[56] References Cited

U.S. PATENT DOCUMENTS

| | | | |
|---|---|---|---|
| 2,946,943 | 7/1960 | Nye et al. | 328/127 |
| 3,252,099 | 5/1966 | Dodd | 328/58 |
| 4,134,444 | 1/1979 | Fujie et al. | 164/155 |
| 4,137,504 | 1/1979 | Simmons | 328/127 |

FOREIGN PATENT DOCUMENTS

2307846  8/1974  Fed. Rep. of Germany ........... 164/155

Primary Examiner—Robert D. Baldwin
Assistant Examiner—K. Y. Lin
Attorney, Agent, or Firm—Stevens, Davis, Miller & Mosher

[57] ABSTRACT

A foundry installation control device is disclosed for causing a rapid cut off of a molten metal flow at the time when a mold is full. Two detectors are provided, one of which collects information concerning the instantaneous rate of metal flow pouring from a ladle into a sprue cup while the other collects information on the level of the molten metal in the cup. An electronic circuit connected to the outputs of the two detectors produces a mold filling signal which undergoes a sharp fluctuation at the precise moment when filling is completed. This signal is compared with an instruction value and causes the generation of a flow cut-off signal which triggers the cessation of pouring by righting of the ladle in the case of a tilting ladle, closing of the stopper in the case of a bottom-pour ladle, or closing the discharge valve in the case of a pressure ladle.

9 Claims, 4 Drawing Figures

FLOW CUT-OFF METHOD AND APPARATUS FOR FOUNDRY INSTALLATIONS

BACKGROUND AND SUMMARY OF THE INVENTION

The present invention relates to a method and apparatus for controlling the flow cut-off of molten metal in a foundry installation wherein a ladle pours molten metal into successive molds each provided with a sprue cup.

In foundry installations which effect the filling in series of individual sand or permanent molds which are closed and provided with a sprue cup, the control for cutting-off the casting ladle at the time when the mold is full is important since it determines the quality of the molded article, the safety of the operation, the regular course of the casting operations, as well as the amount of metal wasted. In point of face, it is of decisive importance that the stopping of the pouring of the mold be brought about only at the moment when the mold is actually full, in order to avoid rejects due to lack of material within the mold. On the other hand, it is necessary to avoid the control being effected too late and the mold overflowing from its sprue cup which on the one hand might be dangerous and on the other hand require the interruption of the pouring operations and possibly the additional operations of freeing or cleaning the area where pouring is effected. Finally, the economic aspect of the problem must also be considered. In point of fact, the metal contained in the cup at the time of the stopping of the pouring generally represents a relatively large proportion of the metal of the part. After removal from the mold, this column of metal must be detached. It can be recovered and recycled but as the cost of remelting is proportional to the weight of the material to be recycled, a decrease in this quantity as a result of an accurate adjustment of the control for the stopping of the pouring represents a substantial decrease in the cost of manufacture of the parts.

Customarily, the stopping of the pouring when the mold is full is a manual operation. The founder visually notes at what moment the mold is full by observing the reactions of the surface of the metal in the cup as a function of the rate of flow of the stream falling from the casting ladle into the cup. In view of the time of human response, the metal actually ceases to flow into the mold only a certain time after complete filling has been detected, so that the manual control of the righting of the ladle, or of the closing of the ladle stopper, or of the closing of the discharge in the case of pressure ladles always leads to a certain loss of metal upon each pouring operation.

It has already been attempted to provide devices which detect the end of the filling and automatically stop the pouring. However, up to now these devices have always formed part of dosaging techniques and required a special shape of the mold which harmonizes poorly with the other requirements of the technique of the foundry. Thus, it has already been contemplated to provide vents at places judiciously located in the mold and observe the appearance of the metal in these orifices, which signals the filling of the mold. However, it is frequently difficult to produce vents which can be used for this purpose. The vents are an additional cause of consumption of metal and, because of fluid dynamics may have undesirable consequences on the quality of the parts, or even prevent parts from being produced without major difficulties.

It has also been contemplated to provide, at the top of the sprue cup, a sort of overflow area which is filled with metal when the level in the sprue cup exceeds a maximum value. However, with this known solution for the problem of automatically interrupting the pouring, it is not possible to detect situations where the overflow area becomes filled before the mold as a result of splattering of metal or as a result of an irregularity in the flow from the sprue cup towards the cavity of the mold.

Accordingly, an object of the present invention is to create a device for stopping the pouring operation which monitors and analyzes the dynamic parameters of the system formed of the metal stream flowing from the ladle and the content of the sprue cup so as to detect the moment at which the behavior of this system corresponds to the conditions of total filling of the mold and bring about the cessation of metal pouring, i.e., righting of the tilting casting ladle, the closing of the stopper of a bottom pour ladle, or the closing of the discharge valve of a pressure ladle so as to terminate the flow of the metal at the proper time.

For this purpose, the invention entails a process for automatically stopping the pouring of the molten metal from a movable lip-type ladle or a bottom-pour or pressure-type ladle into a foundry mold provided with a sprue cup, characterized by the fact that it comprises at least a remote measurement of the free surface of the metal in the sprue cup and the rate of flow of the pouring stream; the production of a filling signal by derivation and summation from these measurements, the filling signal manifesting a sharp fluctuation when the free surface of the metal rises in the cup as a result of the complete filling of the mold; the comparison of the filling signal with a pre-established instruction value; and, the emission of a flow cut-off signal when the filling signal reaches the instruction value.

Furthermore, the apparatus constructed in accordance with the invention comprises a detection system; an emitter of a fixed or variable reference signal; and, an electronic circuit. The detection system is adapted to supply continuously or at a sufficiently rapid rate to the electronic circuit input signals at least one of which is a level signal corresponding to the level of the metal in the sprue cup and at least one second flow signal corresponding to the rate of flow of metal falling into the sprue cup. The electronic circuit is adapted to produce a filling signal from the input signals, to compare the filling signal with the reference signal, and to emit a flow cut-off signal which acts directly or indirectly on the ladle control motor when the filling signal exceeds a given instruction value of the reference signal, the instruction value being either automatically produced or not by the system itself.

BRIEF DESCRIPTION OF THE DRAWINGS

Two embodiments of the apparatus constructed in accordance with the invention will be described below by way of example with reference to the accompanying drawings in which:

FIG. 1 shows a sand mold 1, borne by a carriage 2 which moves along rails 3. Above the rails 3 there is located a hoisting system 4 from which there is suspended a casting ladle with lip 6, the inclining and righting of which are controlled by a motor 7 and by a chain 8 connecting the ladle to the motor. As can be noted in FIG. 1, the mold 1 has a sprue cup 9, the upper end of which is generally of approximately frustoconical shape and which places the upper face of the mold 1 into communication vertically with the cavity 10, the shape of which is that of the part to be cast.

Figure 1:
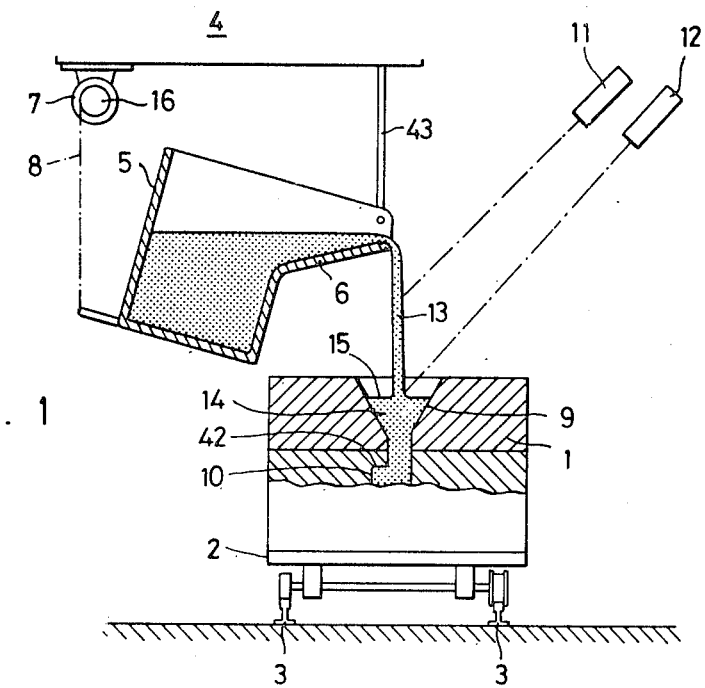
FIG. 1 is a diagrammatic elevation, partially in section, showing a foundry installation intended for the filling in series of sand molds from a tilting ladle.

Two detectors 11 and 12 continuously observe the dynamic behavior of the system formed by the stream of metal 13 which flows from the lip 6 and the amount of metal 14 which has penetrated into the sprue cup and which has a free surface 15. It can be seen that the variations in the level 15 depend on the difference between the rate of flow of the stream 13 and the rate of flow of metal which flows towards the cavity 10 from the cup 9. The detector 11 is arranged at a reasonable distance (for instance, 2 to 5 meters) from the mold and from the ladle so as to supply a flow signal which is proportional to the width of the stream 13, as seen from the place where this detector 11 is located. Similarly, the detector 12, which is preferably located in the vicinity of the detector 11, emits a signal which corresponds to the level 15 of metal in the sprue cup 9. In point of fact, this signal will be a function of the area of the free surface of the column of metal 14. As the cup is of frustoconical shape, it will be seen that there is a bi-univocal relationship between the height of the level 15 and this area.

The detectors 11 and 12 are photosensitive detectors which react to the visible and/or thermal radiation of the molten metal. Each detector has a sensitive member and an optical system which forms a real image of the portion of metal to be measured on a screen in front of the sensitive member. Thus, if the image formed in front of the sensitive member of the detector 11 is that of a given length of the stream 13, the luminous intensity of this image will be proportional to the width of the steam. The signal emitted by the detector 11 will therefore be proportional to this width. Similarly, the output signal of the detector 12 will be proportional to the area of the free surface of the column of metal 14. The detectors used here are known per se. It will therefore not be necessary to describe them in detail. A description of them will be found for instance in Swiss Pat. No. 778,588 (Swiss Patent Application 3540/76).

Figure 2:
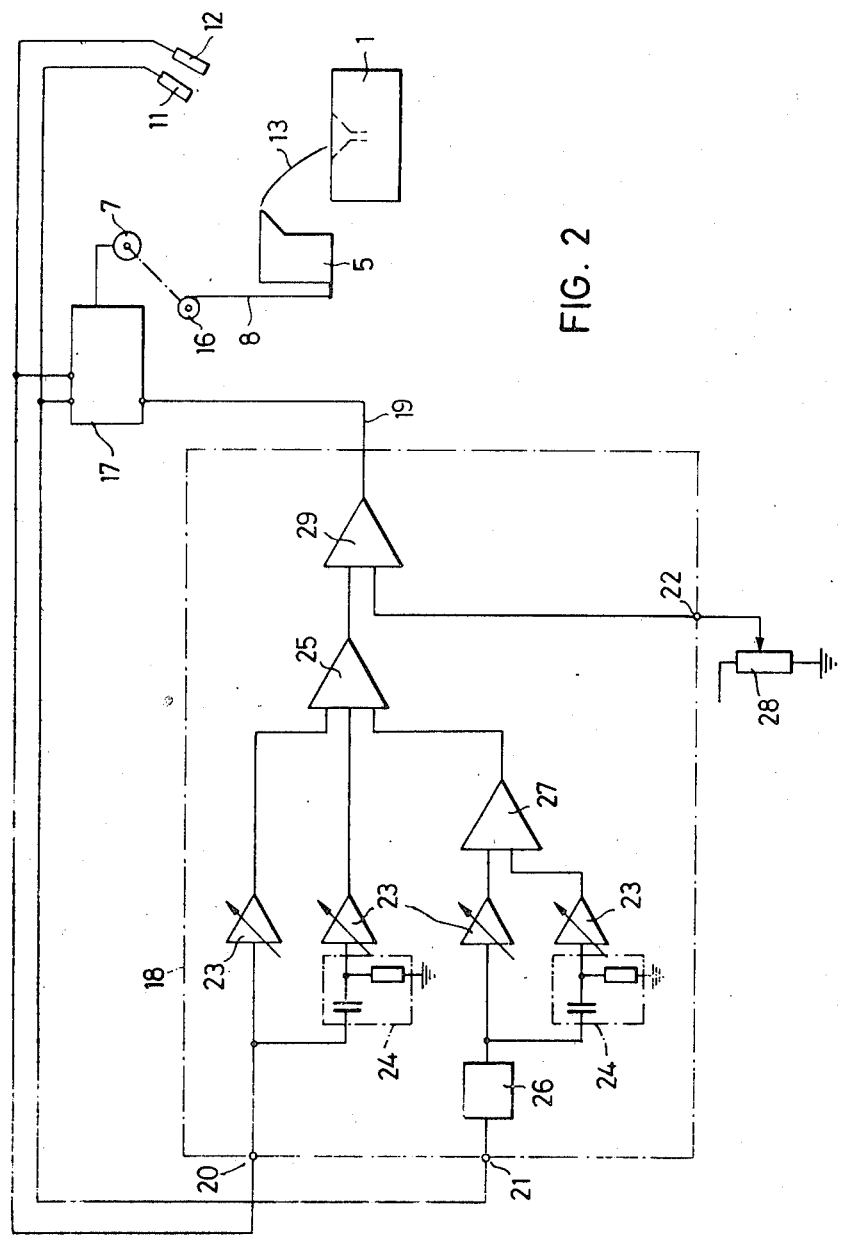
FIG. 2 is a block diagram of the device including an electronic circuit which controls this installation.

FIG. 2 shows a general diagram of the control device. This figure shows the two detectors 11 and 12, a tilting casting ladle 5 with its control chain 8 which winds onto a winch 16 driven by the motor 7. The mold 1 is shown schematically. The device comprises electronic circuits, which for clarity of description are divided here into two circuits 17 and 18. The circuit 17, which will not be described in detail, is an automatic control circuit which permanently controls the rate of flow of the stream 13 upon the casting. The details of this circuit are described, in particular, in the aforementioned Swiss patent application. However, this circuit is not indispensable for carrying out the present invention and could also be omitted. The second circuit, shown in FIG. 2 and designated by 18, produces the flow cut-off signal when the mold is full. This signal is emitted onto the line 19 and passes through the circuit 17 to produce a rapid rotation of the motor 7 in the direction which causes the righting of the ladle 5. As stated previously, this flow cut-off signal is produced from three input signals which arrive at the circuit via the inputs 20, 21 and 22. The first of these signals consists of a level signal, the second of a rate of flow signal and the third of an instruction signal. The level signal 20 is conducted to one of the variable-gain amplifiers 23 as well as to a differentiation circuit 24, which at its output supplies a signal which is proportional to the derivative in time of the level signal. This derivative signal is also conducted to one of the variable-gain amplifiers 23 and both the level signal 20 and its derivative feed a summation circuit 25 which is also fed with a signal having a sign opposite to that of a signal produced from the information supplied by the rate of flow detector 11. This rate flow information arrives via the input 21, enters a circuit 26 which increases the input signal to the second power in order to produce a signal proportional to the cross section of the stream, that is to say to the rate of flow of metal flowing from the ladle. In another embodiment of the device, the cross-section signal is obtained by the use of two detectors directed perpendicular to each other, the circuit 26 being then used as an analog multiplier. The signal proportional to the rate of flow is also introduced, on the one hand, into a variable-gain amplifier 23 and, on the other hand, into a differentiator 24 whose output is connected to a fourth variable-gain amplifier 23. The two signals which constitute the elements of the rate of flow signal, that is to say the signal proportional to the rate of flow proper and the signal which is proportional to its derivative in time, are conducted to an inverting adder 27 whose output is connected to the third input of the adder 25, as previously stated.

It will thus be understood that the signal coming from the adder 25 is a filling signal resulting by interpretation of the simultaneous observation of the rate of flow of the stream 13 and of the metal level 15. In point of fact, as long as conditions of stability prevail, the rate of flow of the stream 13 is equal, or approximately equal, to the rate of flow of the column 14 and the level is stationary. The derived signals are zero and, due to the inversion which takes place in the adder 27, the signal coming from the adder 25 is of opposite sign to that obtained when the mold reaches the filled condition. These normal conditions last until the moment when the filling terminates, the filled condition of the system being then immediately detected by the fact that the level 15 rises. Not only does the signal supplied by the detector 12 increase in intensity but a derivative signal appears, so that the filling signal increases very rapidly.

On the other hand, the rate of metal flow from the ladle decreases. As a matter of fact if, as in the example taken here, the installation is equipped with an automatic regulating device 17, the increase of the level in the sprue cup causes an order to reduce the rate of flow so that the ladle tends to right itself slowly, which causes a decrease in the rate of flow. The signal emitted by the detector 11 decreases and furthermore a derivative signal which is negative since the rate of flow decreases appears in the circuit 24 connected between the circuits 26 and 27 and, due to the inversion of sign in the adder 27, the signal which has just been added to the third input of the adder 25 is greatly increased. However, if no automatic regulating circuit is provided in the installation, the founder who is supervising the course of the operation visually detects the increase in level and acts to right the ladle or to close the stopper by manual control. Of course, this control is a fine control which implies small modifications of the inclination of the ladle but does not cause the rapid interruption of the flow of metal which must take place as soon as the complete filling of the mold has been detected. Now this filling is actually detected in a completely unequivocal manner due to the appearance of the output signal of the adder 25. This signal greatly increases as soon as the conditions which correspond to the actual filling of the mold are satisfied. It is sufficient that the reference element 28, formed for instance of a potentiometric divider fed by a voltage coming from a circuit (not shown), be adjusted to the desired value in order that the comparator 29 can produce at a given time the output signal which is conducted by the line 19 and which controls flow cut-off, as stated at the start. The flow cut-off signal causes a rapid rotation of the motor 7, not limited to a small angle but continuing until the ladle has been righted into a predetermined position.

The elements of the electronic circuit as described above permit all possible system adjustments and it has been found that the above described combination as a whole detects the dynamic changes of the metal stream/sprue cup system much faster than the human eye, and reacts accordingly, which makes it possible to save a large amount of metal by reducing the height of the sprue cup 14.

Figure 3:
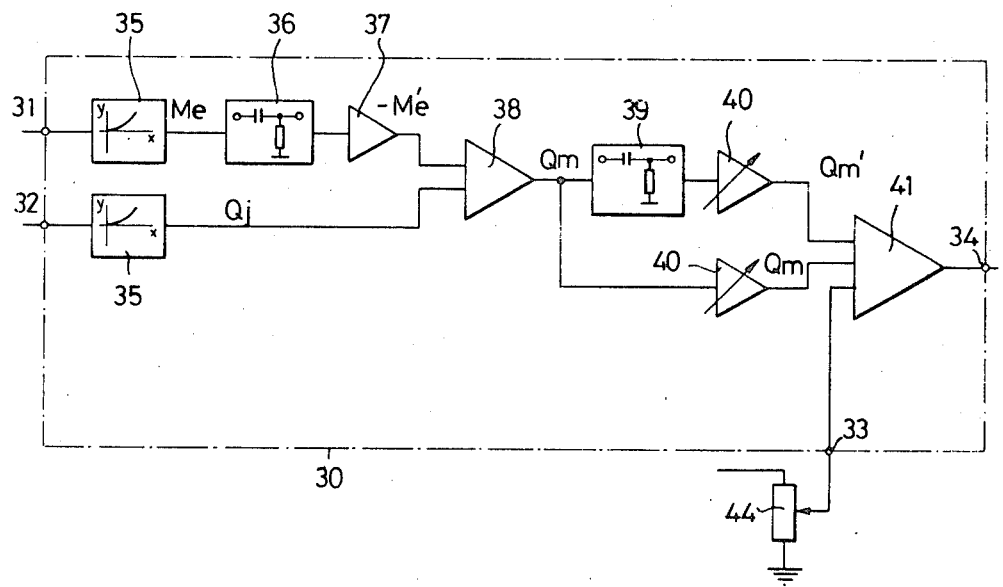
FIG. 3 is a block diagram of the electronic circuit of a second embodiment of the control device.

The same result can also be obtained with the electronic circuit of FIG. 3 which is different from that of circuit 18. This circuit 30 also comprises three inputs 31, 32 and 33 and an output 34 for the flow cut-off signal. The inputs 31 and 32 receive the level signal coming from the detector 12 and the rate-of-flow signal coming from the detector 11 respectively. In a first group of circuits 35, the rate-of-flow and level input signals are respectively corrected so that the signals coming from these circuits 35 have a value proportional to the rate-of-flow of the pouring stream 13, designated by Qj, and the amount of metal contained in the cup between the level 15 and the bottom of the cup, designated Me. The circuit 35 is shown in the drawing as a quadratic characteristic correcting circuit. In the circuit 36, which is a differentiator circuit, the signal corresponding to the mass of metal Me is differentiated, while in the circuit 37 the derivative Me' of the mass of metal is inverted, so that at its output the inverter 37 supplies the signal $\overline{Me'}$. Circuit 30 includes an element 38 which is an adder having inputs which receive, one the one hand, the signal $\overline{Me'}$ and, on the other hand, the signal Qj. This adder therefore supplies at its output a rate-of-flow signal which can be called Qm and which corresponds to the rate of flow of metal flowing from the cup towards the mold. This rate of flow is obtained by the equation:

$$Qm = Qj - dMe/dt = Qh + \overline{Me'}$$

The signal corresponding to the rate of flow of metal penetrating into the cavity of the mold Qm is then differentiated in the differentiator 39 to give Qm, and then amplified by one of the variable-gain amplifiers 40. At the same time, the signal Qm passes to a second variable-gain amplifier 40 and the two signals Qm' and Qm are supplied to two of the inputs of the adder-comparator 41. The third input of this adder-comparator receives the instruction value signal which comes from the input 33. It will be seen that upon completion of filling, Qm drops to zero while Qm' changes in sign. In contrast, during pouring the rate of flow Qm remains different from zero and it undergoes only small variations, so that Qm' is small. The sum of the signals Qm + Qm' therefore varies suddenly, changing sign as soon as the filling is complete, which makes it possible to detect this condition with high sensitivity.

Of course, other variants can also be devised for the electronic circuit of the device described. Similarly, it is not necessary that the detectors 11 and 12 be photosensitive detectors of the kind described. Thus, for instance, in order to detect the instantaneous rate of flow flowing from the ladle into the sprue cup, a weight measurement could be employed. For this purpose, suitable balance detection devices exist, and their details are already known per se. For example, the weight of the ladle 5 could be measured via the tensile force in the chain 8 and in the suspension bar 43. Likewise, the detection of the level by means of mechanical or electrical sensors could also be contemplated. One could also supplement the electronic circuit, for instance, by an analyzer. It has been observed that in certain cases, for instance where the cavity of the mold has a very pronounced shoulder at its upper part, such as the shoulder 42, one can find at the input of the last comparator of the control circuits 18 or 30 conditions which are similar to those which cause the appearance of the flow cut-off signal before the filling of the mold is effected. In this case, a second flow cut-off signal is produced a short time later if the cut-off has not been brought about upon the first signal. One can therefore contemplate an analyzer which eliminates the influence of the first flow cut-off signal and which permits only the second signal to act effectively on the flow cut-off device.

Figure 4:
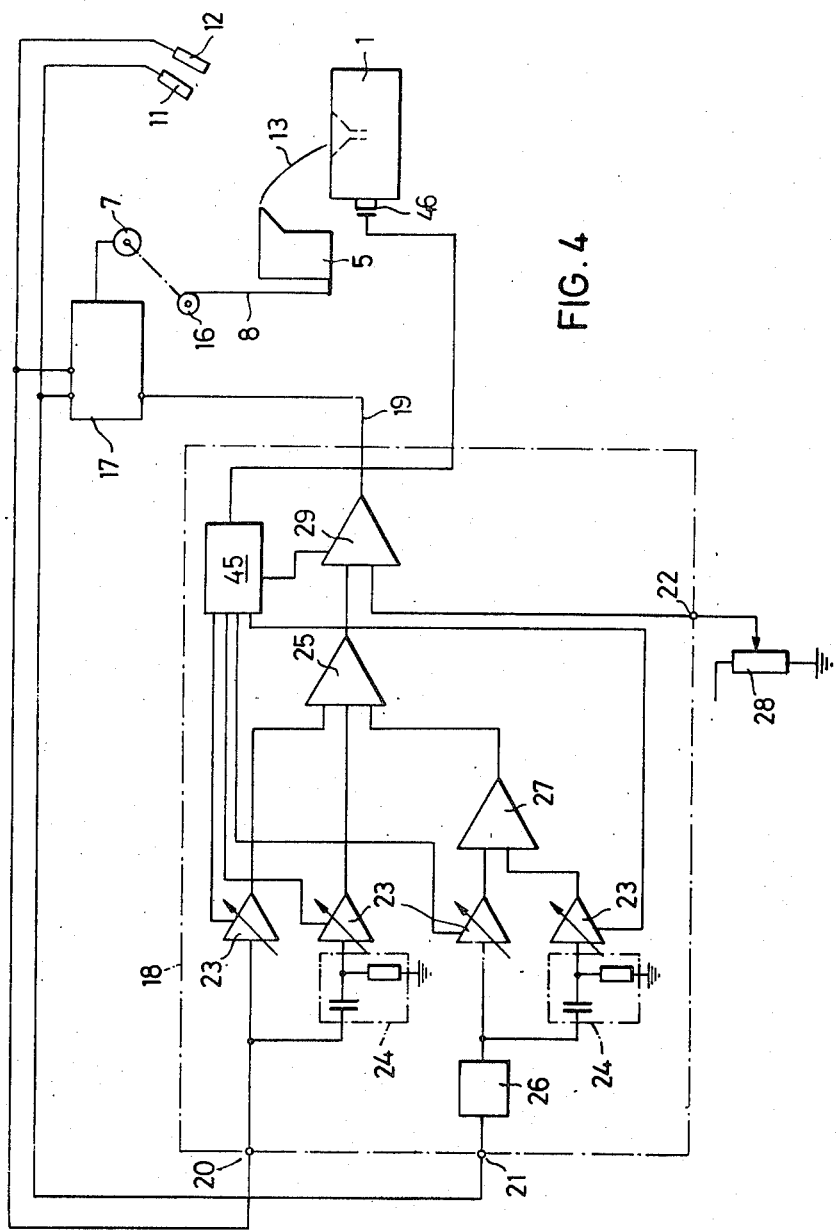
FIG. 4 is a block diagram of still another embodiment of the control device.

With the circuits described, there may be associated, for instance as shown in FIG. 4, a microprocessor 45 and the necessary interfaces which makes it possible to automatically vary the gains of the amplifiers described, as well as the reference values 28 or 44. Upon serial casing, automatic feedback can be introduced, the information collected upon the pouring of one mold being utilized to optimalize the parameters of the following pouring. This latter possibility is, of course, used jointly with the aforementioned pouring control circuit. In particular, one could vary the level in the cup, for instance maintaining it high during the first portion of the pouring and then lowering it towards the end of the pouring. A conventional electronic circuit can calculate the quantity which has flowed into a first mold by forming the integral in time of the rate of flow of the stream measured, for instance, by the detector 11 and the circuits which are associated with it and provide an order for the switching of the reference level in the cup and/or for other parameters of the system when a predetermined proportion of the previously calculated quantity has poured into the following mold. In the case of molding machines operating with alternately changing patterns, the processor will suitably memorize the information. Finally, special parameters can be introduced for the different patterns to be cast by means of markings 46 borne by the mold, punched cards, information received from a main control station, or by any other means suitable to the specific case.

In general, experience has shown that by simultaneously detecting the rate of flow of the stream in the cup and the level of the metal in said cup, one can produce, precisely and with great reliability, a flow cut-off signal which causes a rapid reaction of the ladle as soon as conditions of total filling are realized and which therefore permits substantial savings of metal while improving the uniformity of the pouring operation.

Although specific embodiments of the invention have been described in detail, they are to be considered as merely exemplary since many modifications can be made thereto without departing from the spirit and scope of the invention which is limited solely by the appended claims.

What is claimed is:

1. A control system for a casting installation comprising a casting ladle containing molten metal for filling a mold; at least one mold having an inner cavity and a sprue cup thereon, said mold being filled by a stream of metal which falls from said casting ladle into said sprue cup, thus forming in said sprue cup an accumulation of metal with a free surface while flowing from said sprue cup towards said inner cavity, a first detector means for measuring the level of said surface and for generating a first analog signal corresponding to said level, a second detector means for measuring the width of said stream and for generating a second analog signal corresponding to said width; an electronic circuit means having a first input connected to said first detector means for receiving said first analog signal, a second input connected to said second detector means for receiving said second analog signal and an output; flow cut-off control means for causing said casting ladle to cease filling said sprue cup; and a connection means disposed between said output and said flow cut-off control means, said electronic circuit means comprising differentiation means, summing means and amplification means, said electronic circuit means processing both of said analog signals and forming a filling control signal from both of said processed analog signals, said filling control signal representing the flow rate of molten metal through said sprue cup, said filling control signal having an abrupt fluctuation when the flow rate of molten metal through said sprue cup undergoes an abrupt change indicating that said molten metal ceases to flow from said sprue cup into said cavity while said stream is not cut-off, whereupon said signal exceeds a predetermined threshold and actuates said flow cut-off control means.

2. The control system of claim 1, wherein said amplification means comprise variable-gain amplifiers.

3. The control system of claim 1, comprising two photosensitive detectors for monitoring the width of said stream and for generating corresponding analog signals, said detectors being directed perpendicular to each other, and wherein said electronic circuit means further comprises a multiplier for preliminarily multiplying said width analog signals for forming a rate of flow analog signal.

4. The control system of claim 1, wherein said electronic circuit means further comprises an analyzer, said analyzer being connected to a marking borne by the mold and acting onto the said differentiation, summing, and amplification means for automatically varying their function characteristics.

5. The control system of claim 1, further comprising a means for generating a reference signal representing said predetermined threshold, said reference generator means being connected to said electronic circuit means and operating as a function of at least one parameter of said installation.

6. The control system of claim 1, wherein said electronic circuit comprises two differentiators, each acting upon a respective one of said analog signals, and first and second adders, said first adder receiving a rate of flow analog signal processed from said analog signal corresponding to the width of the stream and the derivative thereof and inverting the sum of these signals, said second adder receiving said surface level analog signal and the inverted signal supplied by said first adder, the output of said second adder forming said filling control signal.

7. The control system of claim 6, wherein said electronic circuit further comprises a multiplier for preliminarily squaring the analog signal representing the rate of flow of said stream of molten metal falling into said sprue cup and wherein said sensor means comprises a pair of photosensitive sensors measuring respectively the width of said stream falling from said ladle into said sprue cup and the level of said surface.

8. The control system of claim 1, wherein said electronic circuit comprises a proportionality correcting circuit receiving said first analog signal, a first differentiator connected to the output of said proportionality correcting circuit for deriving a first input signal corresponding to said level, a quadratic-characteristic correcting circuit receiving said width second analog signal and forming a second input signal, a first adder for adding the inverse of said derived first input signal to said second input signal corresponding to said rate of flow, said first adder supplying an intermediate signal corresponding to the rate of flow of molten metal from said sprue cup into said mold, a second differentiator for differentiating said intermediate signal leaving said first adder, a summing circuit for forming said filling signal as the sum of said intermediate signal and the derivative thereof, said filling control signal representing the fluctuation in the rate of flow from said sprue cup.

9. The control system of claim 4, wherein said analyzer comprises a microprocessor.

* * * * *